US011323319B2

(12) United States Patent
Ritchie

(10) Patent No.: US 11,323,319 B2
(45) Date of Patent: May 3, 2022

(54) SYSTEMS AND METHODS FOR DYNAMIC LAYER 3 NETWORK CONNECTIONS

(71) Applicant: Level 3 Communications, LLC, Broomfield, CO (US)

(72) Inventor: Austin D. Ritchie, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 163 days.

(21) Appl. No.: 16/995,494

(22) Filed: Aug. 17, 2020

(65) Prior Publication Data

US 2021/0058290 A1    Feb. 25, 2021

Related U.S. Application Data

(60) Provisional application No. 62/889,789, filed on Aug. 21, 2019.

(51) Int. Cl.
*H04L 41/0806* (2022.01)
*H04L 41/0869* (2022.01)
*H04L 45/745* (2022.01)

(52) U.S. Cl.
CPC ...... *H04L 41/0806* (2013.01); *H04L 41/0869* (2013.01); *H04L 45/745* (2013.01)

(58) Field of Classification Search
USPC ...................................................... 370/254
See application file for complete search history.

(56) References Cited

U.S. PATENT DOCUMENTS 10,341,224 B2 *   7/2019   Sundaram ............... H04L 49/30
10,425,319 B2 *   9/2019   Ashwood-Smith ..........................
                                                           H04L 41/0886

(Continued)

FOREIGN PATENT DOCUMENTS

EP          2961100        12/2015
WO     WO-2019140486         7/2019

OTHER PUBLICATIONS

International Search Report and Written Opinion of the International Searching Authority, dated Nov. 19, 2020, Int'l Appl. No. PCT/US20/046681, Int'l Filing Date Aug. 17, 2020; 16 pgs.

*Primary Examiner* — Anthony Mejia

(57) ABSTRACT

A dynamic controller to automatically generate layer 3 network connections between devices and/or networks associated with a virtual computing environment in response to a request for such connections is provided such that communications associated with the computing environment may be transmitted between the endpoints. For example, the dynamic controller may connect one or more cloud service provider networks, one or more customer-controlled data centers, one or more customer networks, and the like, based on information provided in a connection request. A layer 3 communication controller may also be instantiated within a core network that manages the flow of communications between the connected networks, such as by translating messages between the connected networks so that messages intended for a connected network may match the supported communication protocols of that network and/or providing one or more security features to the transmitted communications.

20 Claims, 6 Drawing Sheets

(56) References Cited

U.S. PATENT DOCUMENTS

| | | | | |
|---|---|---|---|---|
| 2014/0064275 A1* | 3/2014 | Hammer | ............... | H04L 45/741 |
| | | | | 370/392 |
| 2014/0313931 A1* | 10/2014 | Roper | ..................... | H04L 45/02 |
| | | | | 370/254 |
| 2014/0313937 A1* | 10/2014 | Roper | ..................... | H04L 45/26 |
| | | | | 370/255 |
| 2017/0257439 A1* | 9/2017 | Wang | ................... | H04L 12/462 |

* cited by examiner

US 11,323,319 B2

SYSTEMS AND METHODS FOR DYNAMIC LAYER 3 NETWORK CONNECTIONS

CROSS-REFERENCE TO RELATED APPLICATION

This application is related to and claims priority under 35 U.S.C. § 119(e) from U.S. Patent Application No. 62/889,789, filed Aug. 21, 2019 entitled "SYSTEMS AND METHODS FOR DYNAMIC LAYER 3 NETWORK CONNECTION," the entire contents of which is incorporated herein by reference for all purposes.

TECHNICAL FIELD

Aspects of the present disclosure generally relate to systems and method for implementing a telecommunications or data network, and more specifically to a system and method for dynamically generating a layer 3 connection between multiple endpoints via a communications network based on a connecting request.

BACKGROUND

Telecommunication networks provide for the transmission of voice, data and many forms of digital information, and facilitate providing various forms of networking services to devices and other networks. In some instances, the telecommunications network may provide connections between network devices, network services, network computing environments, cloud services, etc. on behalf of customers, which may enable or provide access to a service or enhance a customer's network in some form. In some instances, such connections may be at the network layer—also referred to as the layer 3 level. The network layer corresponds to layer 3 of the commonly-referenced multi-layer communication model known as the Open Systems Interconnection (OSI) model. The network layer is concerned with moving data sequences (sometimes referred to as "packets") along a transmission route from a first endpoint to a second endpoint or node, often via one or more networking devices of a first network and a second network between the endpoints. One basic example of a network layer transmission is the use of Internet Protocol (IP) addressing to route a packet or packets through a network or between networks.

In some instances, a network provides connections between disparate networks, data centers, components, etc. of a cloud or virtual computing environment for one or more users of the network. For example, the virtual computing environment may utilize a first cloud computing environment to store data, a second cloud computing environment to perform computations or other procedures on that data, and components of customer-managed networks to manage the data and/or receive the data from customers. The communication packets transmitted between the disparate components or networks of the virtual computing environment may be transmitted over a backbone network that is part of the broader telecommunications network. However, managing the connections between the various environments and/or components may be time consuming, cost ineffective, and computationally intensive. Further, some environments may have communication protocols that are incompatible with other environments, potentially requiring redirection of communications between the environments to other environments or network components to accommodate the differing protocols of the environment.

It is with these observations in mind, among others, that various aspects of the present disclosure were conceived.

SUMMARY

One aspect of the present disclosure relates to a method for dynamically establishing a telecommunications path. The method may include the operation of accessing, at a computing device, a request to provision a layer 3 network path via a core network between a first network port of a first network distinct from the core network and a second network port of a second network distinct from the core network, the request comprising a plurality of connection parameters comprising an identification of the first network port and an identification of the second network port. The method may also include the operations of generating a network configuration file comprising configuration data associated with generating the layer 3 network path via the core network and configuring, based on the network configuration file, at least one networking device of the core network to receive a layer 3 communication from the first network port and transmit the layer 3 communication to the second network port.

Another aspect of the present disclosure relates to a layer 3 dynamic controller. The layer 3 dynamic controller may include a communication port in communication with a network information database storing network configuration information of a core communications network and a processor in communication with the communication port and a tangible storage medium storing instructions. The instructions, when executed by the processor, may perform operations including receiving a request to provision a layer 3 network path via the core communications network between a first network port of a first network distinct from the core network and a second network port of a second network distinct from the core network, the request comprising a plurality of connection parameters comprising an identification of the first network port and an identification of the second network port, accessing, from the network information database, the network configuration information to identify a networking device of the core network for inclusion in the layer 3 network path and to obtain configuration information of the identified networking device, and generating a network configuration file comprising configuration instructions to configure, based on the accessed configuration information, the identified networking device to transmit layer 3 communications between the first network port of the first network and the second network port of the second network.

Yet another aspect of the present disclosure relates to a system for dynamic layer 3 network path generation. The system may include a network information database storing network configuration information of a core communications network, a computing device in communication with the network information database for accessing the configuration information of the core communications network, and a network service orchestration system (NSO) executing configuration instructions of a network configuration file to provision a layer 3 path via the core communications network. The computing device may access, in response to a request to provision the layer 3 network path via the core communications network, the configuration information stored in the network information database and identify, based on connection parameters associated with the request and the configuration information, a networking device of the core network for inclusion in the layer 3 network path connecting a first network port of a first network distinct from the core network and a second network port of a second network distinct from the core network. The computing device may also generate the network configuration file comprising configuration instructions to configure, based on the accessed configuration information, the identified networking device to transmit layer 3 communications between the first network port of the first network and the second network port of the second network and transmit the network configuration file to the NSO

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
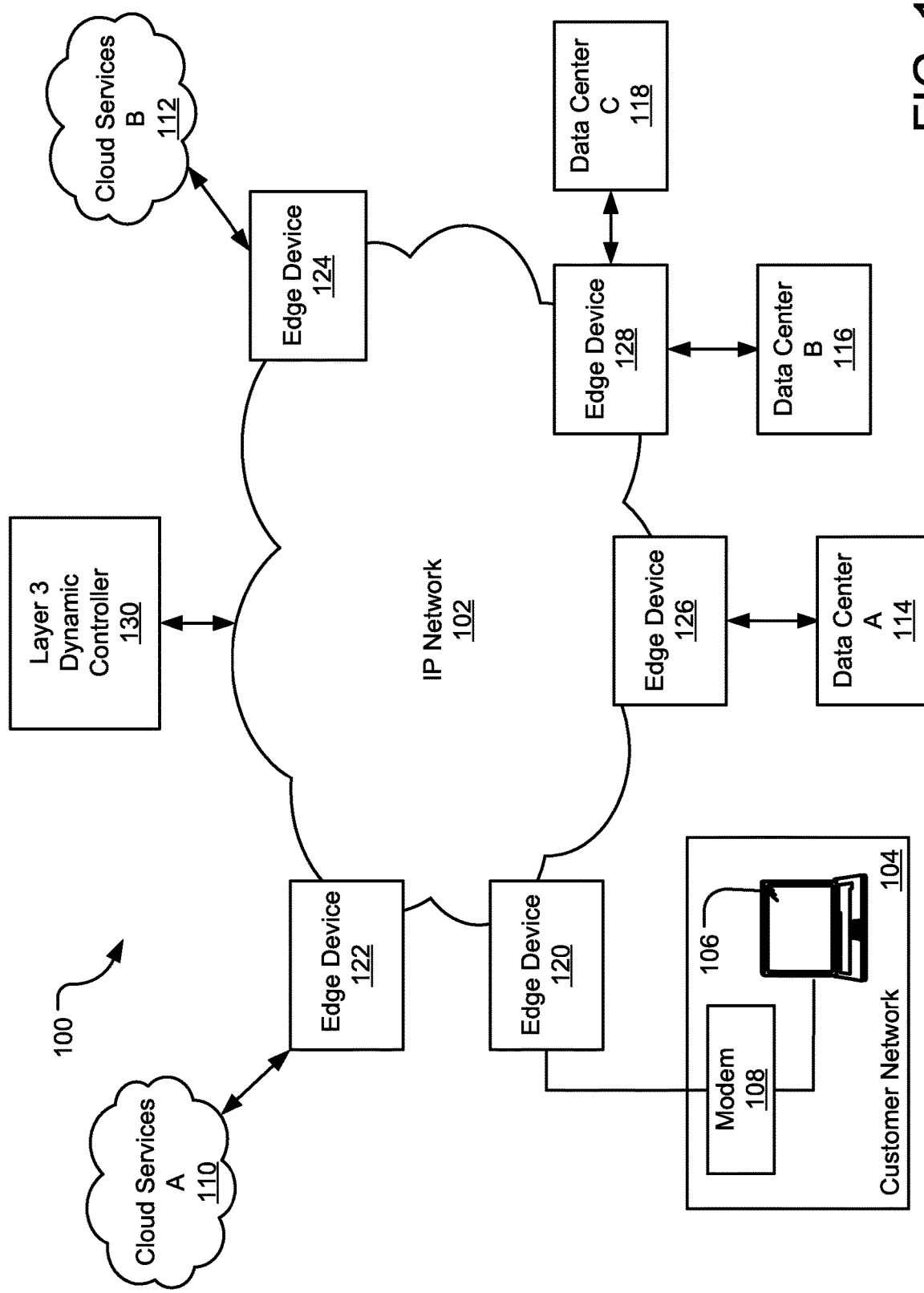
FIG. 1 illustrates an exemplary system operable to manage requests for network services and provide dynamic connections in a network, according to aspects of the present disclosure.

Systems and methods are disclosed involving a controller (referred to herein as a "dynamic controller") that automatically generates layer 3 network connections between devices and/or networks (sometimes referred to as "endpoints") associated with a virtual computing environment in response to a request for such connections. In particular, responsive to a request, which may be from user interface or customer device, the dynamic controller generates a layer 3 network connection path or paths between two or more endpoint devices or networks of the virtual computing environment such that communications associated with the computing environment may be transmitted between the endpoints. For example, the dynamic controller may connect one or more cloud service provider networks, one or more customer-specific networks (such as those housed in customer-controlled data centers), one or more customer networks, and the like, based on information provided in a connection request. A layer 3 communication controller may also be instantiated within a core network that manages the flow of communications between the connected networks. For example, a layer 3 communication controller may translate messages between the connected networks such that messages intended for a connected network may match the supported communication protocols of that network. The network connections may enable separate components of a user's network to communicate without the customer setting up or establishing communications between each individual network. By automatically connecting the separate network environments and providing translation services between the networks (among other services), the time and computational consumption for establishing the connection between the networks is significantly reduced relative to conventional techniques.

In one instance, the layer 3 dynamic controller receives a request from a customer device or is otherwise accessed to generate a layer 3 network connection. The request may include information of the various endpoints to be connected at a layer 3 level. For example, the request may include identification of one or more cloud computing environments, one or more data centers, one or more storage devices, and the like for the layer 3 connection. In some instances, the request may also include information for accessing the components of the interconnected network, such as login information and passwords to the cloud computing environments, Internet Protocol (IP) addresses of components and/or networks, bandwidth limitations of the various networks and/or devices, and the like. The dynamic controller may also obtain such information from a network database in communication with the dynamic controller. In still other instances, the dynamic controller may communicate with one or more of the endpoints to negotiate connection information, such as negotiating an IP address for a cloud computing environment.

Before generating the layer 3 connections, the dynamic controller may validate one or more of the connection parameters for the requested network connection(s). For example, the dynamic controller may access information about the requesting customer's network to determine whether the network connection desired by the customer is supported by the customer's terms of service. The dynamic controller may also access information concerning the endpoints for the layer 3 connections to determine whether the endpoints have available ports or interfaces to generate the requested service or connection. Once the connection parameters are validated, the dynamic controller may generate layer 3 connection paths between the endpoints by configuring network elements along the connection paths accounting for any requirements of the connection parameters. The combination of the endpoint devices or networks and the intermediate network elements define the layer 3 connections, which may be across a core network of preexisting network elements. Core network elements may include provider edge devices, switches, routers, virtual gateway devices, virtual private cloud interfaces, and the like. Generating the layer 3 connections may include verifying that the elements and networks included are available for the requested connection and that the network elements and endpoints satisfy the connection parameters. The dynamic controller may then initiate one or more configurations for the devices and networks included in the connections.

In some instances, the dynamic controller may prepare configurations for the network elements and endpoints of the layer 3 connections in a network activation plan or centralized configuration file. The configuration file specifies configurations for the network elements and endpoints defined by the dynamic controller and the parameters for generating a layer 3 connection between the endpoints. The configuration file may be accessed by a configuration system that applies the configurations to components of the layer 3 connections using the configuration file. Configuring a device may involve activating ports for the network elements of the network connection path. Configuring an endpoint may include providing configuration information to the endpoint instructing the endpoint network to provide a requested service for the connection. Other types of configurations may be included in the configuration file, as discussed below.

Utilizing a dynamic controller as disclosed herein may enable automatic layer 3 connections between separate networks, devices, endpoints, etc. of a virtual computing environment. For example, by using the dynamic controller, a first cloud computing environment, a second cloud computing environment, one or more data centers, and one or more customer networks of the virtual computing environment may be connected at the layer 3 level. Moreover, the system disclosed may facilitate the temporary turn up of such connections, essentially on-demand, as needed to operate the virtual computing environment and the exchange of layer 3 communications between the various endpoints of the connections. Such a system may eliminate waiting for network configuration, circuit turn-up, or technician involvement to obtain the layer 3 connections between the various endpoints, and other conventional time consuming steps.

FIG. 1 illustrates an exemplary system operable to manage requests for network services and provide dynamic layer 3 connections in a network, according to aspects of the present disclosure. In general, the environment 100 includes a telecommunications network 102 (a specific example of which is a "core network") that connects networks and/or customers to provide and receive one or more network services. In particular, one or more customer networks 104 may connect to the IP network 102 to provide and receive communications with other users or other networks, such as cloud service provider A 110, cloud service provider B 112, data center A 114, etc. With specific reference to FIG. 1, the environment 100 includes an IP network 102, which may be provided by a wholesale network service provider.

To facilitate the transmission of communication packets/data between computing devices, users, networks, etc., the network 102 may include numerous networking devices. Such devices or components may include, but are not limited to gateways, routers, route reflectors, and registrars, which enable communication and/or provide services across the IP network 102. In some instances, the network 102 may include edge devices 120-126 that connect to or otherwise provide an interface between networks 102 and other networks or customers of the network 102. Edge devices 120-128 (or other network edge devices) may transmit and/or receive communication packets into and out of the network 102. Transmission of received packets through the network 102 may be performed by one or more other network devices connected between the edge devices 120-128. Communication paths or wires may connect the components of the network 102 such that one or more packets may be transmitted between customers or networks via the components of the network 102. In this manner, communications between the IP network 102 and other entities or networks, such as the one or more customer home or business local area networks (LANs) 104, cloud service providers 110-112, data centers 114-118, etc., may be managed through network environment 100.

In general, customer network 104 can include communication devices such as, but not limited to, a personal computer, wireless communication device, gaming console, etc., connected to a modem 116-120. Although shown in FIG. 1 as computer 110, the communication devices may include any type of communication device that receives a multimedia signal, such as an audio, video or web-based signal, and presents that signal for use by a user of the communication device. In many cases, the computing device 110 may be a wireless computing device. The communication and networking components of the customer network 108 enable a user at the customer network to communicate via the network 102 to other communication devices or receive services from the network 102. The various networks, sites, or devices may connect to network 102 via a respective edge device 120-1228. In some instances, one or more of the endpoints (such as data center B 116 and data center C 118) may connect to network 102 via the same edge device 128.

In one particular example, the network 102 may connect various components of a virtual computing environment. Such components or endpoints may include computing environments or networks (such as a cloud service provider 110,112) configured to provide services to customers of the providers, data centers 114-118 managed by the customer or managed by a third party, the customer's network 104, and other endpoints. For example, the virtual computing environment may include a first cloud computing environment 110 to provide compute services for the environment, a second cloud computing environment 112 to provide some networking services, and one or more data centers 114-118 to provide storage services for the computing environment. In some instances, the endpoints of the virtual computing environment may be geographically disparate such that the IP network 102 may be used as a core network or backbone to connect each endpoint of the virtual computing environment such that packets and other communications may be shared between the networks. These communications may be transmitted on a layer 3 connection between the endpoints. A virtual computing environment controller may thus be included or established in the core network 102 to manage the various components and services of the virtual computing environment. Establishing a layer 3 connection between the various endpoints allows the endpoints to share and receive information and data to perform the functions of the virtual computing environment.

In many instances, utilizing the network 102 to connect endpoints of the virtual computing environment may include various inefficiencies, especially as additional network features are included in the virtual computing environment. For example, the virtual computing environment may include one or more security features to protect the devices and communications of the network. However, such features may require that all communications are routed through a customer-controlled environment, such as customer network 104. Similarly, some endpoints (such as cloud service provider A 110 and cloud service provider B 112) may utilize particular communication protocols that other endpoints do not support. Thus, to communicate with such endpoints, communications may again be routed to a customer-controlled environment so that translation of the communications to a protocol consistent with the destination endpoint may occur. Adding services or features to the virtual computing environment of the endpoints may therefore cause communications to be routed inefficiently between the endpoints. Further, creating the layer 3 connections between the endpoints may be cumbersome for a technician to account for the various communication protocols and features used in connecting the endpoints.

To address these inefficiencies and other considerations, the network environment 100 may include a layer 3 dynamic controller 130 configured to establish layer 3 connections between the endpoints of the virtual computing environment via network 102. As described above, the layer 3 dynamic controller 130 may be available to customers of the network 102 to dynamically create one or more layer 3 connections between the endpoints of the virtual computing environment through a request for such connections. The dynamic controller 130 may receive the request (which may include endpoint and connection information and data) via a user interface or an Application Programming Interface (API) program and generate the layer 3 connections between the endpoints. In some instances, a centralized layer 3 controller or communicator may be instantiated within the network 102 to interface with the various endpoints and provide some services or features for the virtual computing environment, such as translation services and/or security features. In this manner, the layer 3 connections for the virtual computing environment may be generated or created through simple connection requests to improve the efficiency of the transmission of packets between the endpoints and to centrally provide features to the virtual computing environment.

Figure 2:
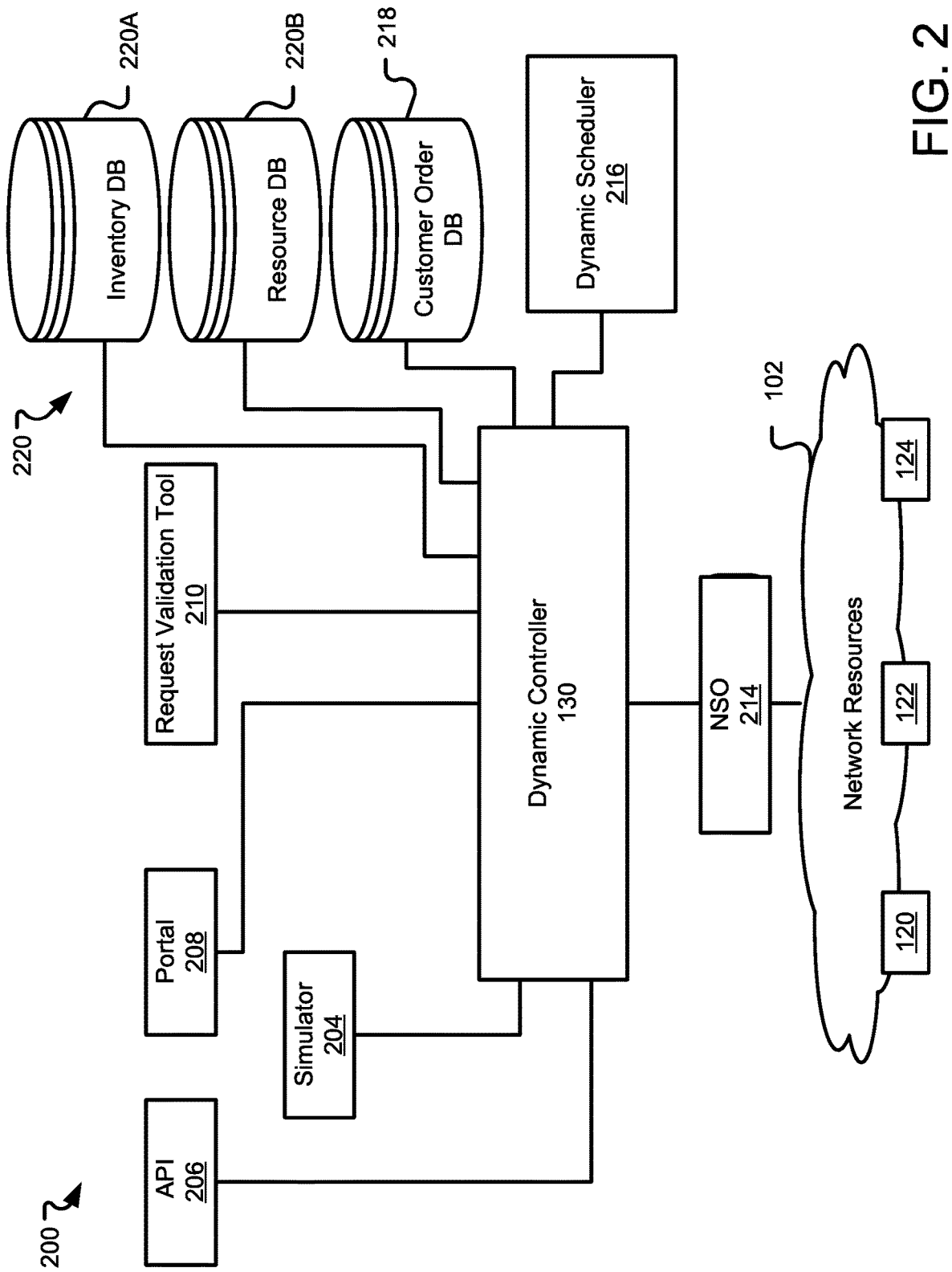
FIG. 2 is a diagram depicting a dynamic controller, according to aspects of the present disclosure.

FIG. 2 is a diagram depicting a layer 3 dynamic controller 130 according to aspects of the present disclosure. The dynamic controller 130 may be utilized by a customer to a network 102 to manage functionality for building layer 3 connections between endpoints of a virtual computing environment via a portal 208 (such as a customer portal/web interface or application) or directly from calls using an application programming interface (API) 206. In some instances, the API 206 and/or portal 208 may connect to or otherwise communicate with the dynamic controller 130 via a secure gateway or other edge-type networking device. The secure gateway may verify the information and/or data (such as user verification information like a password or access credentials) received via the portal 208 or API 206 before transmission to the dynamic controller 130 and communication with the customer begins.

The dynamic controller 130 may further be in communication with or otherwise has access to information about network devices 120-124, such as edge device 120, edge device 122, and edge device 124. Such network resources 120-124, which may also be referred to as network elements, may include switches, routers, or other such networking resources associated with a core network or other networks that form or are otherwise associated with a service provider network such as telecommunications network 102. Configuration of the network devices 120-124 in response to a received layer 3 connection request is described in more detail below.

The dynamic controller 130 is further connected to or has access to one or more databases 220 to obtain network information or data when generating a layer 3 connection. In one embodiment, the databases 220 include an inventory database (DB) 220A which may contain information about the topology of the network 102, such as various types of each network resource 120-124, configuration information, protocol information, network address information, how each network resource 120-124 is used for a layer 3 network connection, how the network resources 120-124 are virtually interconnected, some or all of which may be useful for building a connection path. As such, the inventory database 220A may be referenced by the dynamic controller 130 to generate the layer 3 connections. The databases 220 may further include a resource database 220B containing or having access to information about port/interface availability for each of the network resources 120-124, what device configuration attributes are needed to configure interfaces for each of the network resources 120-124, and the like. For example, the resource database 220B may contain information defining that the edge device 120 communicates with cloud service provider A 110 (such as through an analysis of the IP addresses associated with the edge device 120), and that configuration attributes associated with the connection to the cloud service provider A 110 (such as a range of IP addresses hosted by the cloud service provider, minimum bandwidth for the connection, communication protocols and/or encryption used by the cloud service provider, etc.) are needed to configure the edge device 120 to connect to one or more devices of the cloud service provider A 110. The dynamic controller 130 communicates with and updates the information stored within the databases 220 as the dynamic controller 130 is building, modifying, or tearing down various layer 3 network connections, as described herein.

The databases 220 may also be include a customer order database 218 storing customer information associated with previous or current customer orders. For example, the customer order database 218 may store endpoint information associated with a customer, previous layer 3 connection requests from the customer, one or more service level agreements with the customer and the like. In general, any customer information that may be utilized by the dynamic controller 130 in generating one or more layer 3 requests based on a received connection request may be stored in the customer order database 218.

The dynamic controller 130 may also be in communication with any number of different devices, applications, modules, systems or components to execute the operations described herein. For example, the dynamic controller 130 may utilize a simulator 204, comprising an application or system operable to simulate a layer 3 network connection path for communicating with an endpoint of a virtual computing environment. The simulator 204 may return a verification of a requested connection prior to configuration of the network to provide the requested connection. The dynamic controller 130 may have access to request validation tool 210 to verify one or more layer 3 connection requests are provided by a recognized or validated customer to the network 102. For example, the dynamic controller 130 may verify that a requesting party has particular privileges to connect to other third parties to the network via a layer 3 connection. The dynamic controller 130 may also utilize a dynamic scheduler 216 to manage requests for connections received via the portal 208 and/or API 206. For example, a layer 3 request may include a date/time (or any other indicator of time) for the connection to be instantiated within the network 102. The dynamic scheduler 216 may manage the schedule for instantiating the layer 3 connections within the network 102 based on the received requests.

As further shown in FIG. 2, the dynamic controller 130 may be connected to a network service orchestration (NSO) system 214. The NSO system 214 is in communication with the network 102 to configure one or more of the resources 120-124 of the network 102. As described herein, the dynamic controller 130 retrieves or receives endpoint configuration attributes that are used to configure devices or endpoints (such as cloud computing networks, data centers, customer networks, etc.) for a layer 3 connection between the endpoints and provides such configuration attributes to the NSO system 214. The NSO system 214 comprises a configuration system, and may include one or more computing and network devices, which are operable to apply or implement configurations, defined by the endpoint configuration attributes, to any one of the network resources 120-124 or endpoint network or devices to provision a layer 3 network connection between the endpoints.

Figure 3A:
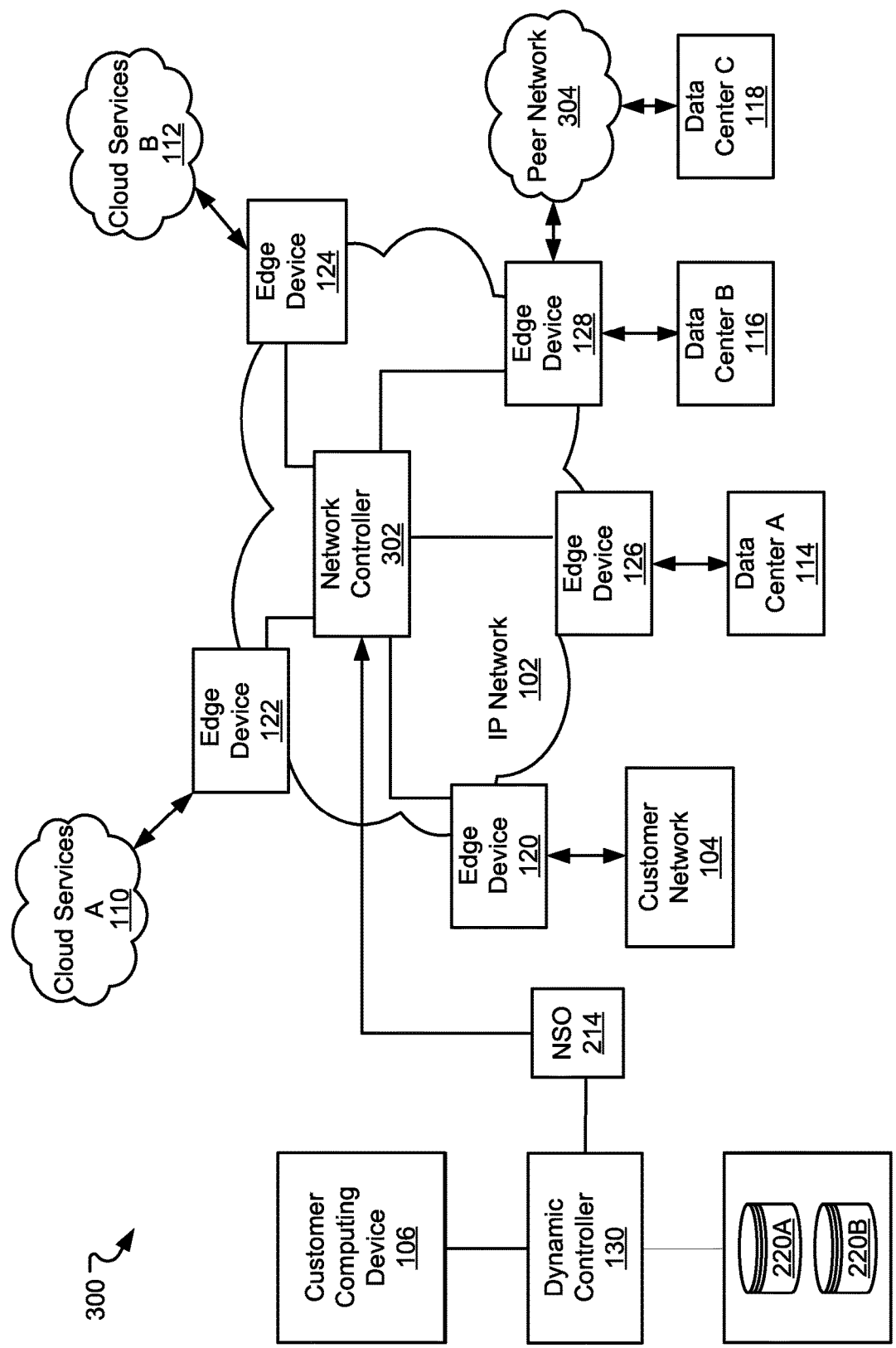
FIGS. 3A-3B illustrate an example of network connection paths that may be generated by a dynamic controller to interconnect endpoints of a virtual computing environment over a core network, according to aspects of the present disclosure.
Figure 4:
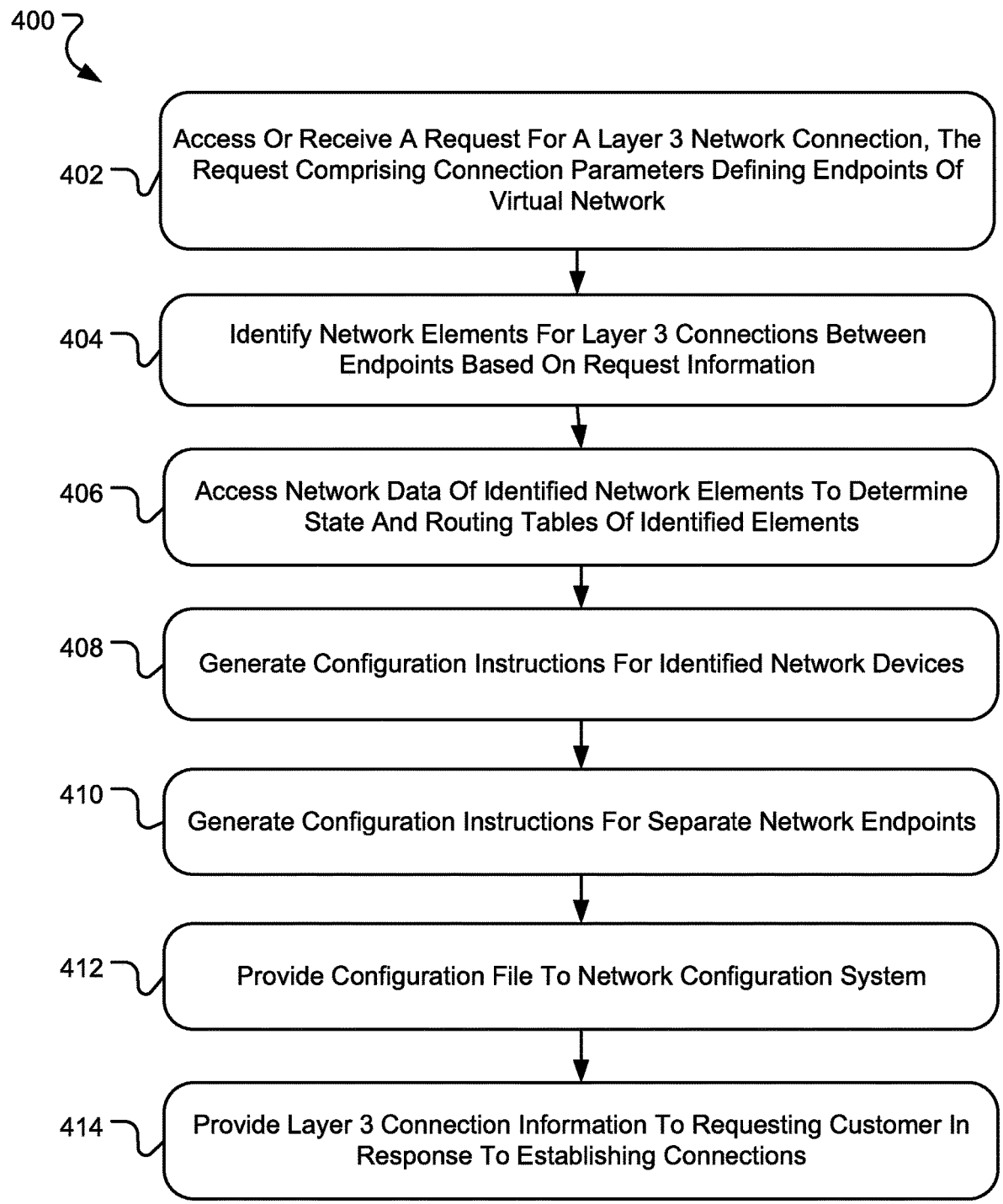
FIG. 4 is an exemplary process flow for managing requests to provision layer 3 network connections between endpoints of a virtual computing environment using the dynamic controller, according to aspects of the present disclosure.

As mentioned above, the dynamic controller 130 may be utilized to generate layer 3 connections between endpoints of a virtual computing environment in response to a request to establish such connections. FIG. 3A illustrates an example of network connection paths that may be generated by the dynamic controller 130 to interconnect endpoints of a virtual computing environment over a core network 102. Many of the components of the environment 300 of FIG. 3A are discussed above, including dynamic controller 130, NSO 214, IP network 102, and the components of the network 102 and the connected to the network 102 to form the virtual computing environment for customer 104. To generate the layer 3 connections between the endpoints of the virtual computing environment of the customer 104, the dynamic controller 130 may execute one or more of the operations of the method 400 of FIG. 4. In particular, FIG. 4 is a flowchart of a method 400 for managing requests to provision layer 3 network connections between endpoints of a virtual computing environment using the dynamic controller 130. The process flow 400 or other similar process flows may be executed to generate layer 3 connection paths to establish a network connection or otherwise provision some type of telecommunications service to connect endpoints of a virtual computing environment. In addition, generating the layer 3 connection path is not limited to the features of process flow 400 and additional features are contemplated.

Figure 3B:
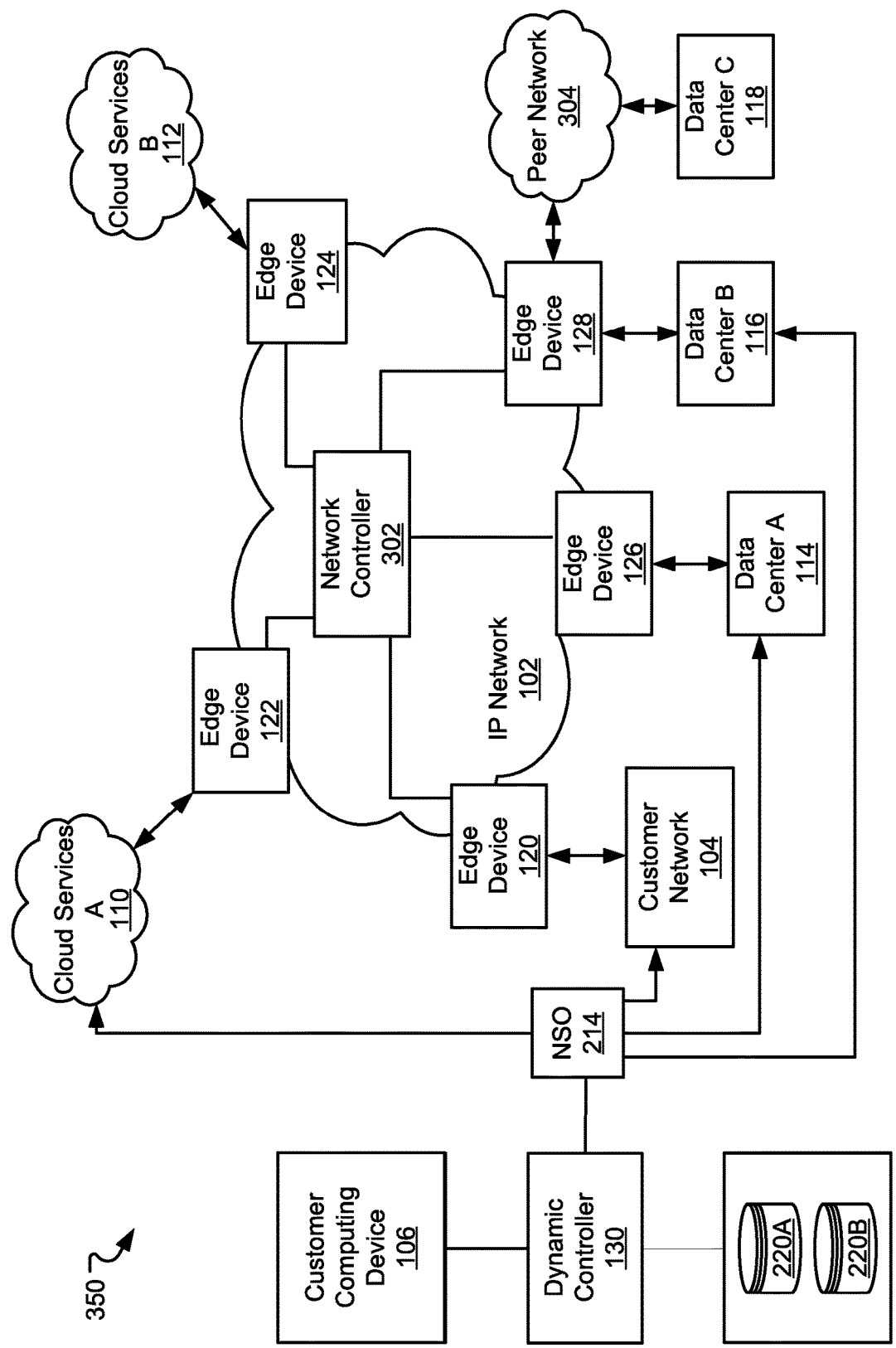

One or more of the operations of the method 400 may be executed by the dynamic controller 130 discussed herein. Such operations may be executed via one or more software programs, one or more hardware components of a computing device, or a combination of software and hardware components. Further, other operations may be executed or performed by other components other than the dynamic controller 130 associated with network 102. For example, a centralized controller may be instantiated within a networking device of the network 102 to perform one or more of the operations described. Also, the operations of the method 400 are discussed herein with reference to the network environment 300 of FIG. 3A and FIG. 3B, among others.

In operation 402, the dynamic controller 130 receives or accesses a request for one or more layer 3 network connections. More particularly, the request may comprise a communication defining or identifying one or more endpoints associated with a virtual computing environment, such as cloud service provider A 110, cloud service provider B 112, data centers A-C 114-118, and the like. In general, the request may include an identification of the endpoints of the virtual computing environment to be connected over a layer 3 connection. Additional information associated with the endpoints may further be included in the request, as discussed in more detail below. The request may originate from a customer computing device 106, and may be transmitted to the dynamic controller 130 in the form of a call through the API 206, or may be generated via the portal 208 which is accessible by the customer computing device 106. To access the portal 108, a customer or other user may log in to the portal using a web browser or other similar interface on the customer computing device 106. The portal 108 may provide any number of input features such as drop down menus, selectable lists, windows, and other features for the customer to initiate the request and define the specific requested network connection.

In one embodiment, the API 206 may comprise a representational state transfer (REST) API. As such, the API 206 may utilize the REST architecture to manage requests. The API 206 may further implement hypertext transfer protocol (HTTP) POST methods which include methods supported by the HTTP protocol and which may further include asynchronous calls. A graphical user interface (GUI) may be built on top of the framework of the API 206 or be integrated within the portal 208. For example, a customer may submit a request using graphical drop down boxes, bullets, or other graphical input features and the request may be translated to an API 206 call and transmitted or otherwise made accessible to the dynamic controller 130. In other words, for example, the portal 208 may comprise a graphical user interface (GUI) accessible by the customer computing device 106, with the API 206 integrated with the portal 208. As a user interacts with the portal 208, the API 206 is implemented in some form to pass communications to and from the dynamic controller 130 and the customer computing device 106. For example, where the customer submits a request using the portal 208, a call, containing the data of the request generated at the portal 208, is generated by the API 206 and submitted to the dynamic controller 130 to provide the information of the request to the dynamic controller 130.

The request received via the API 206 or portal 208 may include information associated with a specific desired network connection using a plurality of connection parameters which may comprise, by non-limiting examples: one or more endpoint identifiers, a request identifier, a user account number identifier, a bandwidth request for each requested connection, access information for one or more endpoints, a class of service (COS) identifier, one or more Internet Protocol (IP) addresses, and routing information associated with the endpoints. In some instances, the endpoints may include a cloud service provider such that the request may include an identifier of the cloud service provider, one or more IP addresses associated with the cloud service provider, configuration information to configure the cloud service provider, access information (such as an access identifier and one or more passwords) to access the services provided by the cloud service provider, and the like. In general, the connection parameters of the request provide information that may be utilized by the dynamic controller 130 to generate a layer 3 connection path to an endpoint and may ultimately be used to provision a network connection or telecommunications service that is specific to the preferences of a customer. For example and in addition to identifying an endpoint and providing access information to the endpoints, the request may include a bandwidth identifier of "100 Megabits per second (Mbps)" for one or more endpoint connections. In some instances, connection to each identified endpoint may include an associated bandwidth. For example, a layer 3 connection to cloud services A 110 may be requested with a first bandwidth identifier and a layer 3 connection to cloud services B 112 may be requested with a second bandwidth identifier different from the first bandwidth identifier. In this manner, the layer 3 connection request may include a requested bandwidth (or other layer 3 connection aspect) for each endpoint connection. Endpoint identification information may include port information, such as a circuit identifier, a service alias, other identifiers in the Access Service Ordering Guidelines (ASOG) standard, and the like. The dynamic controller 130 may utilize such information to generate configuration instructions for devices of the network, including reserving or ensuring that the connections generated provide the requested bandwidth.

Upon receiving the request, one or more aspects of the request may be validated by the dynamic controller 130 or other portion of the network 102. For example, the dynamic controller 130 may verify the request, in some instances utilizing the request validation tool 210, as provided by a customer of the network 102 by analyzing information contained in the request, such as an identification of the customer and/or a customer password to update the network 102. In some instances, a request identifier of the connection parameters may be assigned to the request to distinguish the request from other requests, to retrieve information about network connection paths associated with the request, and for troubleshooting purposes and the like as described herein. For example, where the request fails or is denied by the dynamic controller 130 for whatever reason, the dynamic controller 130 may transmit a message back to the customer computing device 106 referencing the request by its request identifier value. The API 206 may generate a value for the request identifier automatically when a request is first accessed or the value for the request identifier may be specified by a customer interacting with the customer computing device 106.

Other aspects of the request may similarly be validated and a response may be transmitted to the customer computing device 106. For example, access information for cloud service providers 110-112 may be validated by the dynamic controller 130, such as by providing the information to the indicated cloud service providers requesting validation. Access to other endpoints, such as data centers 114-118 and/or a peer network 304 through which an endpoint of the virtual computing environment is accessible, may also be conducted. Validation of bandwidth requests may also be made, including determining a service agreement stored in customer order database 218 with the customer to determine if a requested bandwidth is available to the customer. Other validations, such as availability of layer 3 connections to some endpoints, are discussed in more detail below.

In operation 404, the dynamic controller 130 may identify one or more network components affected by the requested layer 3 connections to the endpoints. For example, the request may include a layer 3 interconnecting mesh of cloud service A 110, cloud service B 112, data centers 114-118, and customer network 104, otherwise referred to as the endpoints of the virtual computing environment created by the requested connections. The dynamic controller 130, based on network and device information stored in database 220A and 220B, may determine the network elements of network 102 needed to establish the requested layer 3 connections. For example, edge devices 120-128 may be included in layer 3 connections to the endpoints. In particular, the dynamic controller 130 may identify edge device 120 as connected to the customer network 104, edge device 122 as connected to cloud service provider A 110, edge device 124 connected to cloud service provide B 112, etc. Identifying the edge devices 120-128 connected to the various endpoints of the virtual computing environment may include accessing or otherwise identifying the routing tables associated with the edge devices to determine networks or devices connected to the edge device. Further, identifying an IP address or other identifier of the endpoint, the dynamic controller 130 may correlate the endpoint with the particular edge device of the network 102 to which the endpoint is connected.

Additional components of the network 102, such as routers, servers, switches, and the like, may also be implicated, but are not shown in FIG. 3 for simplicity. To determine the list of impacted network elements, the dynamic controller 130 may model the requested network connections on a network model based on the network information contained in databases 220A and 220B and identify, via the network model and simulator 204, those components of the network 102 impacted or needed to form the layer 3 connection. In some instances, the dynamic controller 130 may generate new services or virtual devices within the network 102 to support or as part of the identification of network devices. For example, the dynamic controller 130 may generate a request to instantiate a network controller 302 on a server or other networking device of the network 102. The network controller 302 may be tasked with controlling one or more aspects of the generated layer 3 connections for the virtual computing environment. For example, the network controller 302 may include instructions to translate communication packets between endpoints and/or to request IP addresses from one or more cloud service providers 110-112 of a virtual computing environment. As explained in more detail below, the network controller 302 may execute at least a portion of a network configuration file generated by the dynamic controller 130 in response to the connection request.

In addition, the dynamic controller 130 may validate of the request to generate the layer 3 connections in relation to the identified network components. In particular, the dynamic controller 130 validates the individual connection parameters of the request, and, if the connection parameters are valid, the dynamic controller 130 determines whether the layer 3 connection path can be generated in the network 102 using the specific values associated with the connection parameters, taking into account whether network resources 130 are sufficiently available for the desired network connection (as defined by the connection parameters). For example, the request from the customer may include an endpoint that does not have a valid IP address or may not be otherwise accessible by the network 102. In another example, one or more of the network devices included in a proposed layer 3 connection may not support the requested bandwidth for such a connection. In still another example, the request may include a security parameter requesting a particular encryption or other type of security on transmissions over the requested connection. However, one or more network devices of the network 102 may not support the requested security measure. Validation of the request may fail if one or more of the requested connections cannot be made by the network 102 based on the connection parameters included in the request.

Validation by the dynamic controller 130 may further comprise applying one or more rules to the request. An account, associated with the account number identifier, may be limited by a rule that restricts the number and type of connections that can be generated for that account. Upon such validation of the request, the dynamic controller 130 may generate some form of a notification for the customer computing device 106, or issue a message that the request has been initially validated such that a build of the network connection can commence. Specifically, in one example, the dynamic controller 130 may return an HTTP response to the customer computing device 106 to confirm receipt and initial validation of the request. Additional validation steps by the dynamic controller 130 may also occur during generation of network configuration file.

In operation 406, the dynamic controller 130 may access network data from database 220A or database 220B to determine a state and/or routing tables of the identified network elements. For example, the dynamic controller 130 may determine, from the network information, that edge device 120 is already configured to communicate with customer network 104. In particular, edge device 120 may include a routing table of one or more IP addresses associated with customer network 104 such that packets intended for the customer network may be routed to edge device 120. In a similar manner, edge device 128 may be in communication with peer network 304 to exchange packets. The request for connection to data center C 118 may identify peer network 304 as the network through which data center C 118 may be reached. As such, dynamic controller 130 may identify that edge device 128 is already in communication with peer network 304 such that configuration of edge device 128 in response to the request may account for the pre-existing transmission route to peer network 304. In other examples, the dynamic controller 130 may determine that data center A 114 is available via edge device 126, but edge device 126 does not currently include IP addresses for data center A 114. Thus, based on the configuration of edge device 126, the dynamic controller 130 may generate an instruction to configure edge device 126 to add IP addresses of data center A 114 to its routing table.

In other instances, the dynamic controller 130 may analyze the network device information to determine a bandwidth capability of one or more devices of the network 102. Configurations of the network devices to increase or decrease a reserved bandwidth for a particular network device may then be determined in response to a bandwidth request in the connection request from the customer. Thus, determining the state and/or routing information for the identified network elements may generate one or more configuration instructions to modify the configuration of the network element. Any number of additions to routing tables of any number of the devices of the network 102 may be determined in response to the obtained network information.

In still other examples, one or more devices of the network 102 may be configured to provide particular services to the requested layer 3 connections. For example, cloud service A 110 may include particular communication protocols such that packets intended for cloud service provider A 110 may be translated into the expected communication protocol. One or more of the network devices within the communication path to cloud service A 110 may be configured to translate received packets into the communication protocol of the cloud service provider A 110. Similarly, edge device 122 may be configured to receive packets from cloud service provider A 110 with the communication protocol and translate the packet into a different protocol utilized by the network 102. One example includes appending a routing label to the received packet for routing through network 102. A similar translation service may be provided for cloud service provider B 112 or any other endpoint of the virtual computing environment.

In a similar manner, one or more of the devices identified for the requested layer 3 connections may be configured to provide security services or other types of communication features. For example, one or more devices may be configured to provide encryption for transmission through network 102. Thus, a network device, such as edge device 128, may be configured to encrypt packets received from data center B 116 and/or data center C 118. Other network devices, such as edge devices 122-126 may be configured to decrypt encrypted messages for transmission to a connected endpoint. In general, any service provided by the network 102 may be associated with the layer 3 connections of the virtual computing environment by altering one or more states or configurations of the identified network components, as determined by the dynamic controller 130.

In operation 408, the dynamic controller 130 may generate one or more device configuration instructions for one or more identified network devices of the layer 3 connections in response to the request. Such configuration instructions may be configure a layer 2 interface of a device, a layer 3 interface of a device, one or more firewall rules, an aspect of a virtual connection, a routing table, instantiation of a virtual device or computing system, and the like. In general, any configuration or modification available from a network device along the layer 3 connection between the endpoints of the virtual computing environment may be the subject of a configuration instruction generated by the dynamic controller 130 in response to the request for the connection and the identification of the affected network devices.

In addition to configuring network devices within network 102 to carry layer 3 communications between the endpoints of the virtual computing environment, one or more of the endpoints may also be configured in response to the request in operation 410. For example and as shown in the network environment 350 of FIG. 3B, the dynamic controller 130 may, in response to a request to connect to a cloud service provider 110, may contact the cloud service provider 110 with connection information to establish the communication path to the cloud service provider 110. Configuration of the cloud service provider may include, but is not limited to, transmitting requests to the cloud service provider to configure a communication device of the provider to receive communication from the network 102, verifying customer information and rights to configure the cloud service provider, requesting one or more cloud computing services from the cloud service provider (such as a storage service, a networking service, a computing service, a security service, and the like), requesting a Virtual Private Network (VPN) connection, and any other requests accepted by a cloud service provider. Other configurations of endpoints, such as customer network 104, data center A 114, data center B 116, etc., may include the same or similar configuration as discussed above in relation to network devices, including requesting a layer 2 interface, a layer 3 interface, one or more firewall rules, an aspect of a virtual connection, and the like.

Configuration of the endpoints may, in many instances, include setting up or establishing a communication path from the network 102 to the endpoint. In one example, the network 102 may be instructed to provide or exchange one or more IP addresses with the endpoints for transmitting communication packets. For example, the devices of the network 102 may establish a Border Gateway Protocol (BGP) session with one or more endpoints identified in the request for connection. In a BGP session, networking devices may exchange or announce IP addresses served by the announcing device. Thus, edge device 122 may establish a BGP session with cloud service provider A 110, edge device 124 may establish a BGP session with cloud service provider B 112, edge device 128 may establish a BGP session with peer network 304, and the like. The IP addresses utilized in the BGP session may be received in the request received from the customer and/or may include IP addresses associated with the network 102. In general, exchange of IP addresses during a BGP session allows devices to store information in one or more routing tables for transmission of packets into and out of the network 102. In this manner, the configuration instructions generated by the dynamic controller 130 may include instructions to exchange addresses or other network identifiers to aid in establishing the layer 3 connections between the endpoints of the virtual computing environment.

In operation 412, the dynamic controller 130 generates a configuration file of the configuration instructions determined above and provides the configuration file to the NSO 214. In some instances, the configuration file may be simulated by the dynamic controller 130 to ensure that the configuration file, when executed, is a valid network configuration. In one instance, the NSO 214 may be configured to execute the configuration file on one or more components of the network 102 to generate the layer 3 communication paths within the network 102 to connect the endpoints of the customer's virtual computing environment. In particular, the NSO 214 may communicate with the network 102 to access the network devices identified above and to configure the individual network devices according to the configuration file, including instantiating services, updating routing tables, configuring operational states of the devices, and the like. In another instance, the NSO 214 may provide the configuration file to a network device, such as network controller 302, configured to update, modify, or configure the network devices identified in the configuration file. In this instance, the network controller 302 may access one or more of the identified network devices to configure the devices according to the information included in the configuration file. In still other instances, the NSO 214 may execute a portion of the configuration instructions in the configuration file while a network device executes a different portion of the configuration file. The NSO 214 may also be configured to communicate with any of the endpoints of the virtual network to configure one or more aspects of the endpoints. In any case, the configuration file may be applied to the virtual network to configure the devices of the network 102 and/or endpoints to generate one or more of the requested layer 3 connections between endpoints of the customer virtual computing environment.

In operation 414, the dynamic controller 130 may receive information related to the configuration of the network 102 in response to the application or execution of the configuration file on the network devices. For example, the NSO 214 may provide a report to the dynamic controller 130 that includes a success/fail indicator for one or more of the configurations of the network devices for the layer 3 connections. The dynamic controller 130 may then provide or generate a success/failure indication associated with the configuration or generation of the layer 3 connections to the customer computing device 106, via the API 206 or portal 208. The customer may retain the connection report for analysis when activating portions of the virtual computing environment generated via the layer 3 connections.

Figure 5:
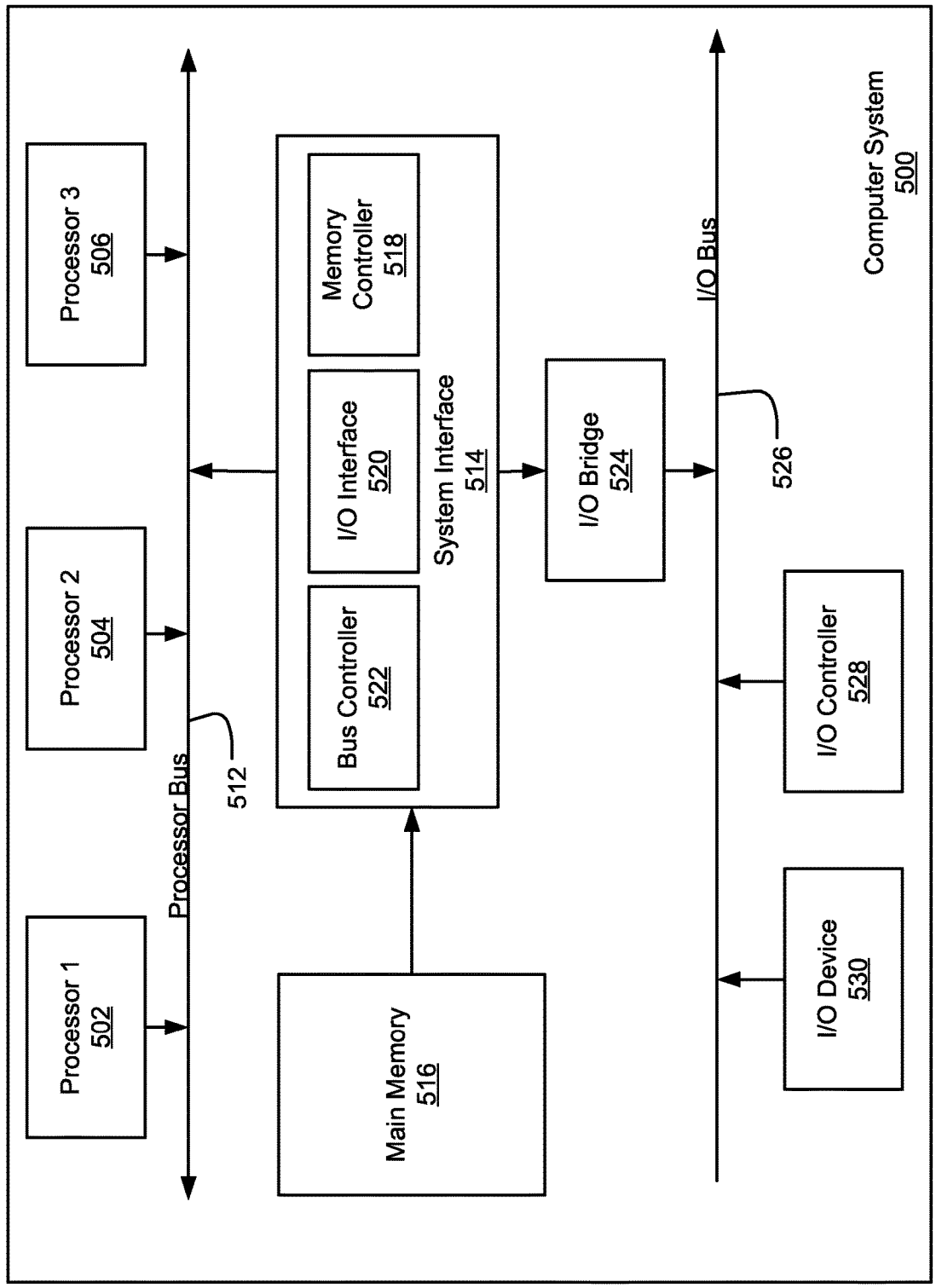
FIG. 5 depicts an exemplary computing system that may implement various services, systems, and methods discussed herein.

FIG. 5 is a block diagram illustrating an example of a computing device or computer system 500 which may be used in implementing the embodiments of the components of the network disclosed above. For example, the computing system 500 of FIG. 5 may be the computing device on which the simulator discussed above is executed. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for dynamically establishing a telecommunications path, comprising:
   accessing, at a computing device, a request to provision a layer 3 network path via a core network between a first network port of a first network distinct from the core network and a second network port of a second network distinct from the core network, the request comprising a plurality of connection parameters comprising an identification of the first network port and an identification of the second network port;
   generating a network configuration file comprising configuration data associated with generating the layer 3 network path via the core network; and
   configuring, based on the network configuration file, at least one networking device of the core network to receive a layer 3 communication from the first network port and transmit the layer 3 communication to the second network port.

2. The method of claim 1 wherein the network configuration file comprises:
   a first configuration instruction to configure the at least one networking device of the core network based on the plurality of connection parameters; and
   a second configuration instruction to configure at least one of the first network port or the second network port based on the plurality of connection parameters.

3. The method of claim 1 wherein generating the network configuration file comprises:
   accessing a network information database storing core network data to identify the networking device for inclusion in the layer 3 network path; and
   accessing, from the network information database, a configuration state of the networking device.

4. The method of claim 1 wherein the plurality of connection parameters comprise one of:
   an account identifier, a desired quality of service identifier, a bandwidth identifier of the first network port, a second bandwidth identifier of the second network port, or a request identifier defining the request.

5. The method of claim 1 wherein the first network comprises a cloud service provider and the second network comprises a data center, the cloud service provider and data center comprising a virtual computing network.

6. The method of claim 5 wherein the plurality of connection parameters comprises a requested service from the cloud service provider, and wherein the network configuration file further configures the cloud service provider to provide the service.

7. The method of claim 1 wherein the networking device is further configured to translate the layer 3 communication from a first transmission protocol of the first network port to a second transmission protocol of the second network port.

8. The method of claim 1 wherein the networking device is further configured to provide a security service to the received layer 3 communication from the first network port, the security service comprising a firewall capability.

9. The method of claim 1 wherein the network configuration file further comprises instructing the networking device to add an Internet Protocol (IP) address to a routing table, the IP address included in the plurality of connection parameters of the request.

10. A layer 3 dynamic controller comprising:
    a communication port in communication with a network information database storing network configuration information of a core communications network;
    a processor in communication with the communication port and a tangible storage medium storing instructions that are executed by the processor to perform operations comprising:
      receiving a request to provision a layer 3 network path via the core communications network between a first network port of a first network distinct from the core network and a second network port of a second network distinct from the core network, the request comprising a plurality of connection parameters comprising an identification of the first network port and an identification of the second network port;
      accessing, from the network information database, the network configuration information to identify a networking device of the core network for inclusion in the layer 3 network path and to obtain configuration information of the identified networking device; and
      generating a network configuration file comprising configuration instructions to configure, based on the accessed configuration information, the identified networking device to transmit layer 3 communications between the first network port of the first network and the second network port of the second network.

11. The layer 3 dynamic controller of claim 10 wherein the network configuration file comprises:
    a first configuration instruction to configure the networking device of the core network based on the plurality of connection parameters of the request; and
    a second configuration instruction to configure at least one of the first network port or the second network port based on the plurality of connection parameters of the request.

12. The layer 3 dynamic controller of claim 11 wherein the instructions that are executed by the processor further perform operations comprising:
    transmitting the network configuration file to a network service orchestration system (NSO), the NSO orchestrating execution of the first configuration instruction to configure the networking device and execution of the second configuration instruction to configure at least one of the first network port or the second network port.

13. The layer 3 dynamic controller of claim 10 wherein the request to provision the layer 3 network path is received from a user interface via an application programming interface (API), the plurality of connection parameters comprising an identifier of a user of the user interface.

14. The layer 3 dynamic controller of claim 10 wherein the instructions that are executed by the processor further perform operations comprising:
validating, based on the network configuration information and the plurality of connection parameters, the request to provision the layer 3 network path via the core communications network.

15. The layer 3 dynamic controller of claim 10 wherein the plurality of connection parameters comprise one of:
an account identifier, a desired quality of service identifier, a bandwidth identifier of the first network port, a second bandwidth identifier of the second network port, or a request identifier defining the request.

16. The layer 3 dynamic controller of claim 10 wherein the first network comprises a cloud service provider and the second network comprises a data center, the cloud service provider and data center comprising a virtual computing network.

17. The layer 3 dynamic controller of claim 11 wherein the first configuration instruction further configures the networking device to translate the layer 3 communications from a first transmission protocol of the first network port to a second transmission protocol of the second network port.

18. The layer 3 dynamic controller of claim 11 wherein the first configuration instruction further configures the networking device to apply a security service to the received layer 3 communications transmitted between the first network port of the first network and the second network port of the second network.

19. A system for dynamic layer 3 network path generation, the system comprising:
a network information database storing network configuration information of a core communications network;
a computing device in communication with the network information database for accessing the configuration information of the core communications network; and
a network service orchestration system (NSO) executing configuration instructions of a network configuration file to provision a layer 3 path via the core communications network, wherein the computing device:
access, in response to a request to provision the layer 3 network path via the core communications network, the configuration information stored in the network information database;
identify, based on connection parameters associated with the request and the configuration information, a networking device of the core network for inclusion in the layer 3 network path connecting a first network port of a first network distinct from the core network and a second network port of a second network distinct from the core network;
generate the network configuration file comprising configuration instructions to configure, based on the accessed configuration information, the identified networking device to transmit layer 3 communications between the first network port of the first network and the second network port of the second network; and
transmit the network configuration file to the NSO.

20. The system of claim 19 wherein the network configuration file comprises:
a first configuration instruction to configure the identified networking device of the core network based on the connection parameters of the request; and
a second configuration instruction to configure at least one of the first network port or the second network port based on the connection parameters of the request.

* * * * *